(12) United States Patent
Jarvis et al.

(10) Patent No.: US 7,472,312 B2
(45) Date of Patent: Dec. 30, 2008

(54) INVALIDATION OF STORAGE CONTROL UNIT CACHE METADATA

(75) Inventors: Thomas C. Jarvis, Tucson, AZ (US); Ronald M. Kern, Tucson, AZ (US)

(73) Assignee: International Business Machines Coporation, Armonk, NY (US)

( * ) Notice: Subject to any disclaimer, the term of this patent is extended or adjusted under 35 U.S.C. 154(b) by 0 days.

(21) Appl. No.: 11/846,560

(22) Filed: Aug. 29, 2007

(65) Prior Publication Data

US 2007/0294589 A1 Dec. 20, 2007

Related U.S. Application Data

(62) Division of application No. 10/837,302, filed on Apr. 30, 2004, now Pat. No. 7,340,652.

(51) Int. Cl.
*G06F 11/00* (2006.01)
(52) U.S. Cl. .......................................... 714/42; 707/202
(58) Field of Classification Search ................... 714/42
See application file for complete search history.

(56) References Cited

U.S. PATENT DOCUMENTS 6,502,174 B1 12/2002 Beardsley et al.
2002/0138695 A1 9/2002 Beardsley et al.
2003/0212921 A1 11/2003 Howe
2003/0220943 A1 11/2003 Curran et al.
2003/0220974 A1 11/2003 Curran et al.
2004/0236772 A1* 11/2004 Arakawa et al. ............ 707/100

* cited by examiner

*Primary Examiner*—Christopher S McCarthy
(74) *Attorney, Agent, or Firm*—Dan Shifrin

(57) ABSTRACT

Method, apparatus and program product are provided for rebuilding faulty metadata in a storage controller coupled to a host device. Faulty metadata may include metadata which no longer matches the associated customer data tracks stored on a DASD or other storage device. When an error in metadata is describing a first customer track is detected, a range of other customer tracks in which the error is also likely to have occurred is identified. The metadata tracks associated with the first customer track and the other customer tracks are selected to be invalidated. A command is received through a host interface, and the specified metadata tracks are invalidated while the controller remains on-line with the host and continues to process other host I/O operations. Subsequently, the invalidated metadata tracks are rebuilt. The disclosed method, apparatus and program product invalidate the faulty metadata with reduced impact on normal host/controller I/O operations.

20 Claims, 3 Drawing Sheets

INVALIDATION OF STORAGE CONTROL UNIT CACHE METADATA

RELATED APPLICATION DATA

This application is a divisional application of commonly assigned U.S. Pat. No. 7,340,652, filed Apr. 30, 2004 and entitled "Invalidation Of Storage Controller Unit Cache Metadata", which patent is hereby incorporated by reference in its entirety. This application is also related to commonly assigned U.S. Pat. No. 6,502,174, entitled "Method And System For Managing Meta Data", and to commonly assigned U.S. Pat. No. 6,988,171, entitled "Method And System For Recovery of Meta Data in a Storage Controller," which patents are hereby incorporated herein by reference in their entireties.

TECHNICAL FIELD

The present invention relates generally to managing data storage control units and, in particular, to initiating a rebuilding of metadata following a mismatch with customer data.

BACKGROUND ART

Computing systems often include one or more host computers ("hosts") for processing data and running application programs, direct access storage devices (DASDs) for storing data, and a storage controller for controlling the transfer of data between the hosts and the DASD. In addition to storing actual data, also known as user or customer data, the control unit often maintains metadata which provides information on tracks or blocks of data in the DASD or in a cache of the storage controller. The storage controller processes the metadata during certain operations on the actual data represented by the metadata to improve the speed and efficiency of those requested operations.

There are numerous types of metadata, such as summary information, partial-copy information, historical information, copy services information, and log structured array information. Summary information summarizes the customer data, including information on the format of a block or track of customer data, such as a count-key-data (CKD) track. In this way, information on the actual customer data that would otherwise have to be gleaned from the customer data itself in a time consuming process is readily available. Partial copy information contains a copy of a portion of the actual customer data to improve destage performance. Historical information records historical usage of the customer data. Historical data may be used to predict future use of the user or customer data. Copy services information contains bit maps that indicate tracks of the customer data that were modified and not yet copied to a secondary site. The log structured array (LSA) information maintains an ISA directory and related data to manage the ISA.

Typically, during initialization of the DASD, metadata is copied from the DASD to the storage controller. As the size of a metadata track and the types of metadata maintained increases, an ever increasing amount of cache storage and processing capacity is dedicated to metadata, to the exclusion of other types of data. In addition, because cache storage is volatile (data stored in cache will be lost in the event of a power loss), some conventional computing systems save metadata that has been modified in cache into separate, battery-backed-up, non-volatile storage units (NVS) for recovery purposes. Such implementations add additional costs and overhead by consuming processor and memory resources to maintain and update the metadata in NVS To conserve NVS capacity, some computing systems will not back-up metadata in NVS. The problem with not providing an NVS backup is that microcode errors, power loss, and other error conditions may cause some or all of the metadata stored in cache to become corrupted or lost. In such case, the storage controller must rebuild the metadata from the actual data in the DASD. This process of recovering lost metadata can be time-consuming, as metadata often represents thousands of customer tracks. In conventional computing systems when modified metadata is not backed-up into NVS, corrupted metadata must be invalidated while the controller is off-line from the host. Then, the metadata is rebuilt in a piecemeal process when its associated customer data is staged into cache for other purposes. As will be appreciated, the, off-line process degrades normal data processing operations.

There thus is a need in the art for an improved method and system for performing a more efficient recovery following a metadata error.

SUMMARY OF THE INVENTION

The present invention provides an improved method, system and program product for invalidating and rebuilding faulty metadata. The metadata provides information on user data maintained in a storage device. The system detects whether an error has occurred in metadata describing a first customer track. A range of other customer tracks in which the error is also likely to have occurred is identified. A command is received through a host interface to invade the metadata track associated with the first customer track and the metadata tracks associated with the identified range of metadata tracks. These metadata tracks are invalidated while the storage controller remains on-line with the host and continues to process other host I/O operations. Subsequently, the invalidated metadata rebuilt. The disclosed method, system and program product invalidate the faulty metadata with reduced impact on normal host/controller I/O operations.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description, reference is made to the accompanying drawings which form a part hereof, and which illustrate several embodiments of the present invention. It is understood that other embodiments may be utilized and structural changes may be made without departing from the scope of the present invention.

Figure 1:
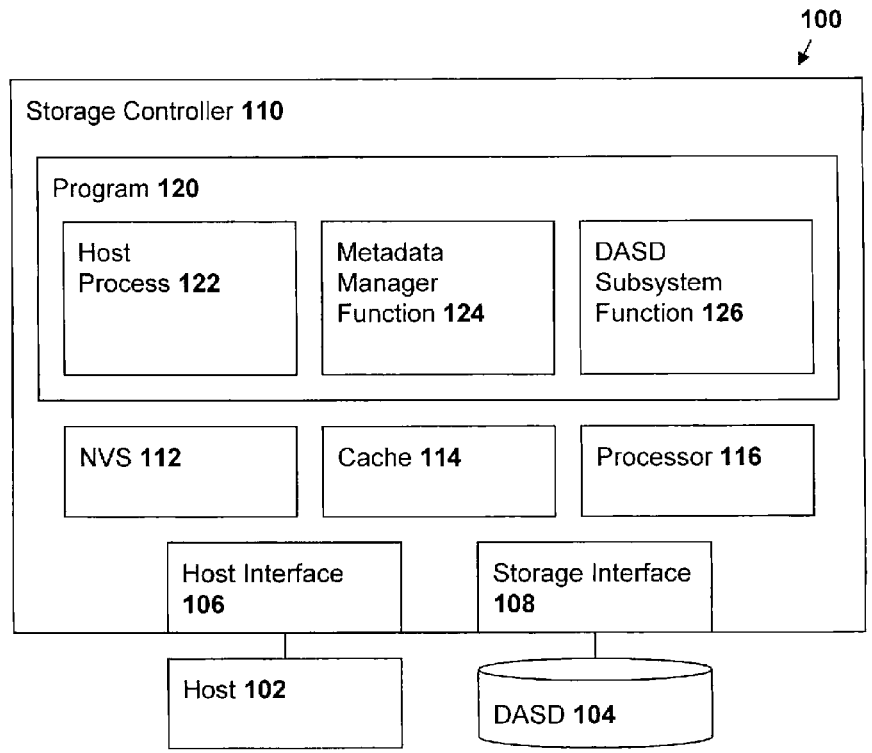
FIG. 1 is a block diagram of a hardware and software environment in which embodiments of the present invention may be implemented.

FIG. 1 illustrates a hardware and software environment in a storage system 100 in which the present invention may be implemented. At least one host 102 is in data communication with storage device, such as a DASD 104, via a host interface 106 and a storage interface 108 in a storage controller 110. The host 102 may be any host system known in the art, such as a mainframe computer, workstation, etc., running under an operating system such as WINDOWS®, AIX®, UNIX®, MVS™, etc. The storage controller 110, host system(s) 102, and DASD 104 may communicate via any network or communication system known in the art, such as LAN, TCP/IP, ESCON®, SAN, SNA, Fibre Channel, SCSI, etc. The DASD 104 may be one or more storage subsystems of hard disk drives, automated storage libraries, optical disks, or any suitable large, non-volatile storage medium known in the art. The storage controller 110 may be any storage controller 110 known in the art, including the IBM 3990 Storage Controller or Enterprise Storage Server® (ESS). AIX, ESCON and Enterprise Storage Server are registered trademarks of International Business Machines Corporation ("IBM®"); MVS is a trademark of IBM; WINDOWS is a registered trademark of Microsoft Corporation; and UNIX is a registered trademark licensed by the XJOpen Company Ltd.

With reference to FIG. 1, the storage controller 110 includes one or more processing units 116 which may execute a program 120 comprised of a host process 122, a metadata manager function 124, and a DASD subsystem function 126. Further included are a cache 114 and a non-volatile storage (NVS) 112. The NVS unit 112 may be a battery backed-up RAM. The host process 122, metadata manager 124, and DASD subsystem functions 126 may be separate programs or functional parts of one or more programs 120 and may be implemented as firmware in a ROM or software logic within an operating system and/or application program within the storage controller 110. The host process 122 is the component of the program 120 that manages communication with the host 102 and the DASD subsystem function 126 manages communication with the DASD 104, The host process 122 executes in the storage controller 110 and manages data requests for customer data from the host 102. The host process 122 also generates a request for metadata when processing the host 102 access request for customer data. The metadata manager function 124 manages communication between the host process 122 and DASD subsystem function 126 components and performs many of the metadata management operations.

The DASD 104 stores both customer data tracks, i.e., the actual data, and metadata tracks. In the embodiment illustrated in FIG. 2, each metadata track 200 is comprised of two segments 210*a, b*. Each segment 210*a, b* includes: a track ID field 212 indicating the physical address (PA) of the metadata in the DASD 104; a metadata field 214 storing the actual metadata; an access lock field 216 storing access lock information; reserved bytes 218; and a longitudinal redundancy check (LRC) field 220 storing LRC information for parity and error checking functions. In alternative embodiments, the order in which the fields 212, 214, 216, 218, 220 are located within a segment 210*a, b* may be different and additional fields may also be provided. The track ID 212 and LRC fields 220 are used for segment validation and the access lock field 216 is used to serialize access to the segments 210*a, b* when multiple hosts are granted access to the metadata track 200. The access lock 216 indicates whether a process has permission to update the metadata track 200.

Figure 2:
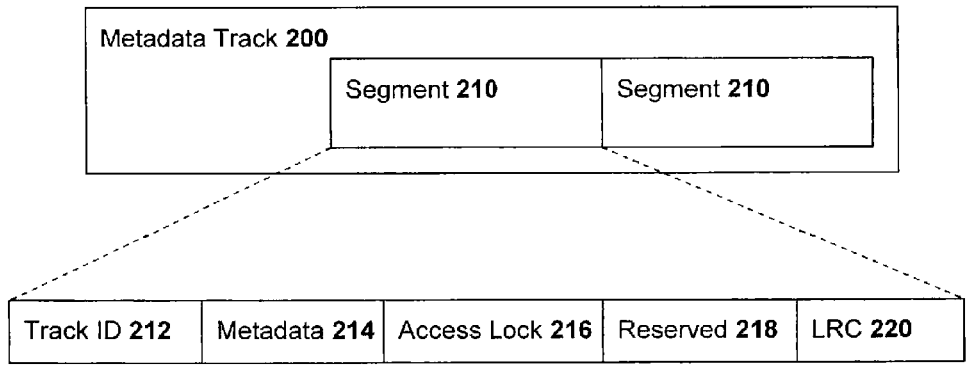
FIG. 2 illustrates a metadata track in accordance with the present invention.

Typically, a metadata track 200 may describe multiple associated customer data tracks. Thus, multiple processes directed toward different customer data tracks may concurrently be allowed non-exclusive access to the metadata track 200. Preferably, after each update or write, the LRC value in the LRC field 220 is updated to reflect the modifications. The format of FIG. 2 is applicable to metadata tracks 200 stored both in DASD 104 and in cache 114.

The NVS 112 may store an identifier, such as the address in the track ID 212 of a metadata track in cache 114 that was modified instead of storing a copy of the metadata. The storage controller 110 may use the NVS 112 during recovery operations to determine which metadata tracks were modified. Storing only identifiers for the modified metadata in NVS 112 instead of the actual metadata increases storage capacity in the NVS 112 for backing-up non-metadata, such as modified customer data that has not yet been destaged to the DASD 104 and conserves processor cycles that would otherwise be consumed maintaining full copies of the metadata tracks in the NVS 112.

The storage controller 110 processes metadata to determine parameters and aspects of the associated customer data to increase the efficiency of processing the customer data. For example, prior to staging in a large block of customer data for a host 102, the metadata manager function 124 may execute a read access request for metadata that contains a history of read accesses to this customer data. The historical information may reveal that only a small subset of the customer data is actually accessed. The storage controller 110 may process this historical information to determine whether to stage only that smaller, frequently accessed subset of data. In this way, the storage controller 110 access time and utilization of cache resources is reduced because the storage controller 110 will not stage more data than needed from the DASD 104 based on historical usage and staging of data. Metadata may also contain information about the format of the associated customer data that the storage controller 110 would otherwise have to access and stage from DASD 104 to consider. In particular, for a fast write access request, the storage controller 110 processes the metadata to determine the format of the customer data to update and then updates the customer data without staging the customer data track into cache. Because the metadata provides information on the format of the customer data, e.g., where the records start, there is no need to stage the actual customer data into cache to determine the format. Once customer data has been modified, the associated metadata may need to be updated accordingly.

After a power loss or other system failure, the modified metadata tracks 200 in cache 114 may be lost, corrupted, invalid or otherwise not match the corresponding customer data tracks. One type of recovery operation is a warmstart recovery. A warmstart recovery is often initiated to recover from microcode errors. Microcode errors are detected by the microcode itself, and may result from a list pointer or an array index that addresses an out-of-bounds address or other unusual states. The microcode, upon detecting a microcode error, may call a specific function that causes lower level operating services to go through a warmstart recovery sequence. Such a warmstart recovery sequence may halt all work-in-progress and cause executing functions to verify associated control structures and data.

When the metadata for a customer track does not match the data on the customer track, a microcode error resulting in a warmstart may occur. Alternatively, when the metadata for a customer track does not match the data on the customer track, a hardware detected error such as a CRC or checksum error may occur, due to an incorrect data length being transferred or due to transferring data from an incorrect location. Thus, the mismatch may mimic an actual hardware error. With either detection mechanism, the recovery for the error should include invalidation and eventual rebuilding of metadata for the track. Additionally, with either detection mechanism, normal operation of the controller halts briefly while the warmstart and/or hardware error recovery takes place.

Frequently, when a metadata mismatch occurs for one customer track, other nearby customer tracks also have such a mismatch. This may be due to a region of metadata which describes multiple customer tracks having been corrupted. When a host accesses multiple tracks in the region (e.g., as part of an operation which sequentially reads tracks, such as a tape backup) then the brief halts caused by repeated warmstarts and/or hardware error recoveries may occur so closely together as to result in an unavailability of the controller to perform I/O operations. Additionally, repeated hardware error recovery actions due to metadata mismatches may result in the controller incorrectly determining that hardware is faulty. In order to prevent such situations, it is often desirable to invalidate metadata for tracks other than the one which was being accessed when the mismatch occurred. For example, it may be desirable to invalidate the metadata for the entire volume so that repeated warmstarts don't occur or invalidate the metadata for a certain number (such as 25) of customer tracks on either side of the customer track whose metadata is in question.

Prior art methods of invalidation of metadata for tracks other than the one on which the mismatch occurred have required that the controller not be operational (that is, offline) at the time metadata is invalidated. Prior art methods also have required that the initiation of the metadata invalidation occur at the controller. The present invention provides a method for a host device 102 to invalidate metadata for multiple customer tracks while the controller 110 remains on-line and operational.

Figure 3:
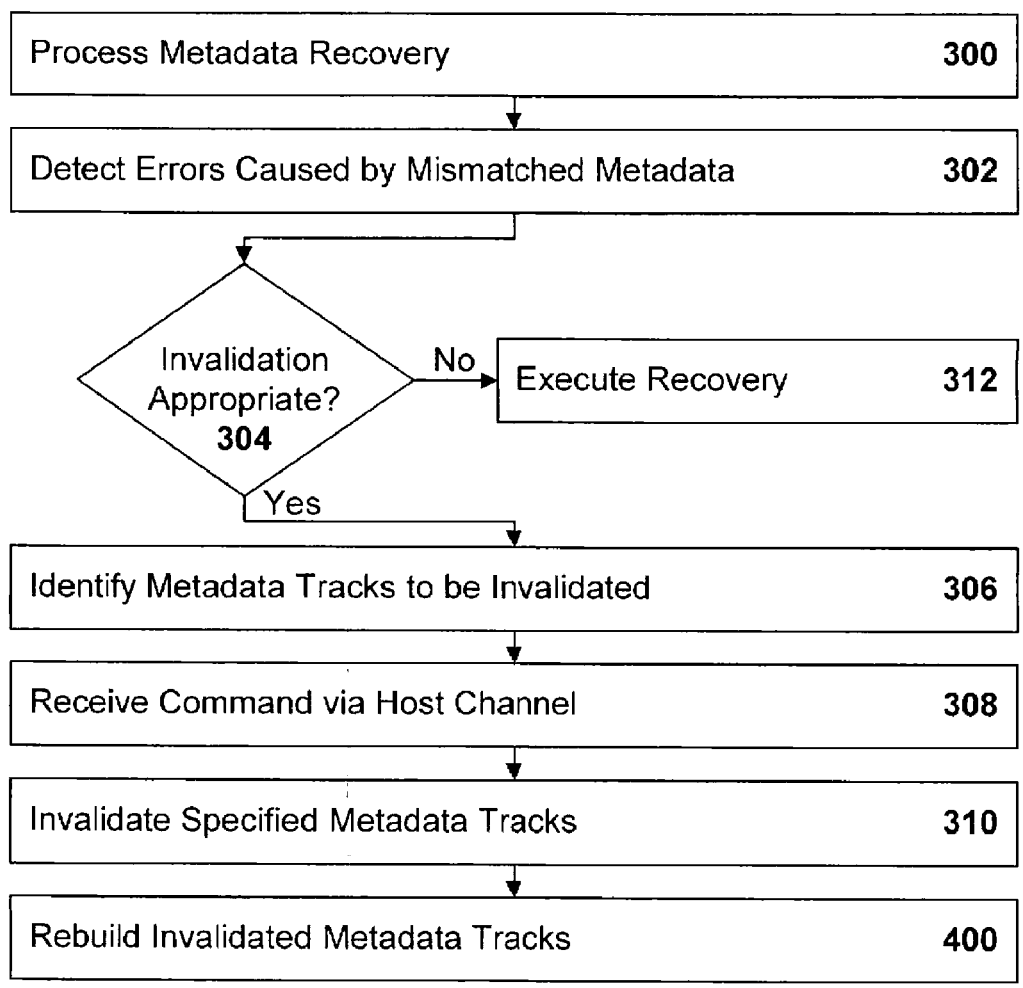
FIG. 3 illustrates logic to invalidate metadata in accordance with the present invention.

FIG. 3 illustrates logic which may be implemented in the controller 110 to recover corrupted or mismatched metadata without significant disruption to normal host and controller operations. Such a process may be implemented by the metadata manager 124 as firmware stored in read-only memory (ROM) of the storage controller 110 or as software logic in the storage controller 110. The metadata recovery process is entered at block 300 following the detection of an event, such as repeated warmstarts, which may be triggered by faulty metadata. Errors caused by any such metadata are detected at block 302 and a determination is made at block 304 whether invalidation of the metadata is appropriate. If invalidation is not appropriate, a recovery operation may be executed at block 312. If, instead, invalidation is appropriate, the metadata to be invalidated is identified at block 306. A single metadata track may be invalidated, a range of tracks may be invalidated, tracks representing an entire volume may be invalidated, tracks representing a number of volumes may be invalidated, or all of the metadata tracks in the controller 110 may be invalidated.

After it is determined which metadata tracks are to be invalidated, a diagnostic control command is received at block 308 by the controller 110 through the host interface. Rather than taking the controller 110 off-line from the host device 102, the controller remains on-line and available to process other host I/O operations. Thus, the negative impact of metadata recovery on normal operations is reduced. The command may be generated by a human operator or automatically by host software. As a result of the command, the selected metadata tracks are invalidated at block 310.

Following the invalidation of the selected metadata tracks, the metadata previously maintained within the metadata tracks must be rebuilt at block 400. One method of rebuilding invalid metadata tracks 200 is to wait until an access request is made for such tracks or an associated customer data track, and then rebuild the metadata track 200 at that time. However, if this method is used, the access request is delayed until the metadata track 200 is rebuilt. To avoid delays in returning metadata tracks 200 to a host process 122, the metadata manager function 124 may execute a background routine to rebuild the metadata tracks 200. Thus, when a host process 122 requests a metadata track, the requested metadata is likely available for immediate return to the host process 122.

Figure 4:
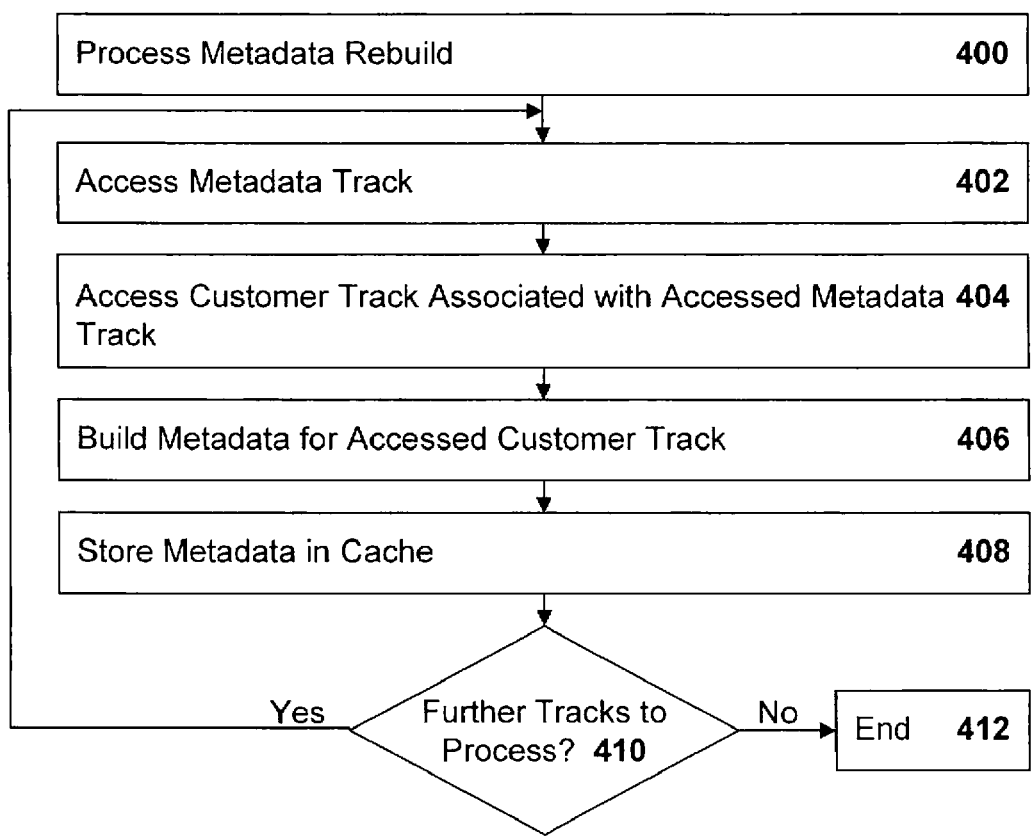
FIG. 4 illustrates logic to rebuild metadata in accordance with the present invention.

FIG. 4 summarizes logic implemented by the metadata manager function 124 to rebuild the metadata tracks indicated in the list of tracks to rebuild. Control begins at 400 where the metadata manager function 124 processes a request to rebuild the invalidated metadata tracks. At block 402, the metadata manager function 124 begins a loop to process each of the metadata tracks 200 to be rebuilt. At block 404, the associated metadata track 200 is accessed. Control then transfers to block 406 where the metadata manager function 124 rebuilds a portion of the modified metadata track 200 corresponding to the accessed customer data track. Control transfers to block 408 to then store the rebuilt metadata in cache 114. Control then transfers to block 410 where the metadata function 124 determines whether there are further customer tracks associated with the accessed metadata track 200 to rebuild. If so, control transfers back to the start of the loop at 402 to process the next customer track. Otherwise, the process ends at block 412.

The present invention may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer-readable devices, carriers, or media, such as a magnetic storage media, "floppy disk," CD-ROM, a file server providing access to the programs, ect. having computer readable code and data files embodied therein. Of course, those skilled in the art will recognize many markings may be made to this configuration without departing from the scope of the present invention.

Moreover, the present invention was described herein with respect to a host 102 system and a storage controller 110. As will be appreciated, the host 102 and storage controller 110 may be any processing unit types known in the art which manage and access metadata. Additionally, metadata was described as customer data on a DASD type device. As will be appreciated, metadata may describe any type of user data maintained on any type of non-volatile storage device, including disk drives, tape cartridges, optical disks, holographic units, etc.

The logic of FIGS. 3 and 4 may be implemented as microcode in a ROM of the storage controller 110 or as software logic that is part of the storage controller operating system or an application program.

The objects of the invention have been fully realized through the embodiments disclosed herein. Those skilled in the art will appreciate that the various aspects of the invention may be achieved through different embodiments without departing from the essential function of the invention. The particular embodiments are illustrative and not meant to limit the scope of the invention as set forth in the following claims.

What is claimed is:

1. A method for rebuilding metadata in a data storage system having a storage control unit coupled to a host device through a host interface, the metadata formatted into one or more metadata tracks each containing information on customer data stored in one or more corresponding customer data tracks, the method comprising:

detecting an occurrence of an error in metadata describing a first customer track;

identifying a range of other customer tracks in which the error in the metadata is also likely to have occurred;

issuing a command from the host device through the host interface of the storage control unit to invalidate the metadata associated with the first customer track and the identified range of customer tracks;

in response to the command, invalidating the metadata associated with the first customer track and the identified range of customer tracks while the storage control unit remains on-line with the host device and continues to process other host I/O operations; and rebuilding the invalidated metadata.

2. The method of claim 1, wherein detecting an occurrence of an error in metadata comprises detecting repeated warmstarts.

3. The method of claim 1, wherein detecting an occurrence of an error in metadata comprises detecting a period of storage control unit unavailability resulting from repeated warmstarts.

4. The method of claim 1, wherein detecting an occurrence of an error in metadata comprises detecting a hardware detected error.

5. The method of claim 1, wherein receiving an invalidating command comprises receiving a command to invalidate one of: a single metadata track, a specified range of metadata tracks, a plurality of metadata tracks associated with a volume of customer data, and all of the metadata tracks in the storage control unit.

6. A system for rebuilding metadata, comprising:

a storage controller coupled to a host device through a host interface;

a memory for storing a plurality of metadata tracks, each metadata track associated with at least one customer track stored on a storage device coupled to the storage controller; and control logic implemented within the storage controller, comprising:

means for detecting an occurrence of an error in metadata describing a first customer track;

means for identifying a range of other customer tracks in which the error in the metadata is also likely to have occurred;

means for issuing a command from the host device through the host interface of the storage control unit to invalidate the metadata associated with the first customer track and the identified range of customer tracks;

means for, in response to the command, invalidating the metadata associated with the first customer track and the identified tracks while the storage control unit remains on-line with the host device and continues to process other host I/O operations; and means for rebuilding the invalidated metadata.

7. The system of claim 6, wherein the means for detecting an occurrence of an error in metadata comprises means for detecting repeated warmstarts.

8. The system of claim 6, wherein the means for detecting an occurrence of an error in metadata comprises means for detecting a period of storage control unit unavailability resulting from repeated warmstarts.

9. The system of claim 6, wherein the means for detecting an occurrence of an error in metadata comprises means for detecting a hardware detected error.

10. The system of claim 6, wherein the means for receiving an invalidating command comprises means for receiving a command to invalidate one of: a single metadata track, a specified range of metadata tracks, a plurality of metadata tracks associated with a volume of customer data, and all of the metadata tracks in the storage control unit.

11. A data processing system, comprising:

a storage controller coupled to a host device through a host interface;

a storage device for storing customer data formatted in customer tracks;

a memory for storing a plurality of metadata tracks, each metadata track associated with at least one customer track; and a processor programmed to execute instructions for:

detecting an occurrence of an error in metadata describing a first customer track;

identifying a range of other customer tracks in which the error in the metadata is also likely to have occurred;

receiving a command from the host device through the host interface of the storage control unit to invalidate the metadata associated with the first customer track and the identified range of customer tracks;

in response to the command, invalidating the metadata associated with the first customer track and the identified range of customer tracks while the storage control unit remains on-line with the host device and continues to process other host I/O operations; and rebuilding the invalidated metadata.

12. The data processing system of claim 11, wherein the instructions for detecting an occurrence of an error in metadata comprise instructions for detecting repeated warmstarts.

13. The data processing system of claim 11, wherein the instructions for detecting an occurrence of an error in metadata comprise instructions for detecting a period of storage control unit unavailability resulting from repeated warmstarts.

14. The data processing system of claim 11, wherein the instructions for detecting an occurrence of an error in metadata comprise instructions for detecting a hardware detected error.

15. The data processing system of claim 11, wherein the instructions for receiving an invalidating command comprise instructions for receiving a command to invalidate one of: a single metadata track, a specified range of metadata tracks, a plurality of metadata tracks associated with a volume of customer data, and all of the metadata tracks in the storage control unit.

16. A computer program product of a computer readable storage medium usable with a programmable computer, the computer program product having computer-readable code embodied therein for processing metadata tracks stored in a memory of a data storage controller coupled to a host device through a host interface and to a storage device, the storage device storing customer data formatted as customer data tracks, each metadata track containing information on one or more associated customer data tracks, the computer-readable code comprising instructions for:

detecting an occurrence of an error in metadata describing a first customer track;

identifying a range of other customer tracks in which the error in the metadata is also likely to have occurred;

receiving a command from the host through the host interface of the storage control unit to invalidate the metadata associated with the first customer track and the identified range of customer tracks;

in response to the command, invalidating the metadata associated with the first customer track and the identified range of customer tracks while the storage control unit remains on-line with the host device and continues to process other host I/O operations; and rebuilding the invalidated metadata.

17. The computer program product of claim 16, wherein the instructions for detecting an occurrence of an error in metadata comprise instructions for detecting repeated warm-starts.

18. The computer program product of claim 16, wherein the instructions for detecting an occurrence of an error in metadata comprise instructions for detecting a period of storage control unit unavailability resulting from repeated warm-starts.

19. The computer program product of claim 16, wherein the instructions for detecting an occurrence of an error in metadata comprise instructions for detecting a hardware detected error.

20. The computer program product of claim 16, wherein the instructions for receiving an invalidating command comprise instructions for receiving a command to invalidate one of: a single metadata track, a specified range of metadata tracks, a plurality of metadata tracks associated with a volume of customer data, and all of the metadata tracks in the storage control unit.

* * * * *